United States Patent Office 3,489,283
Patented Jan. 13, 1970

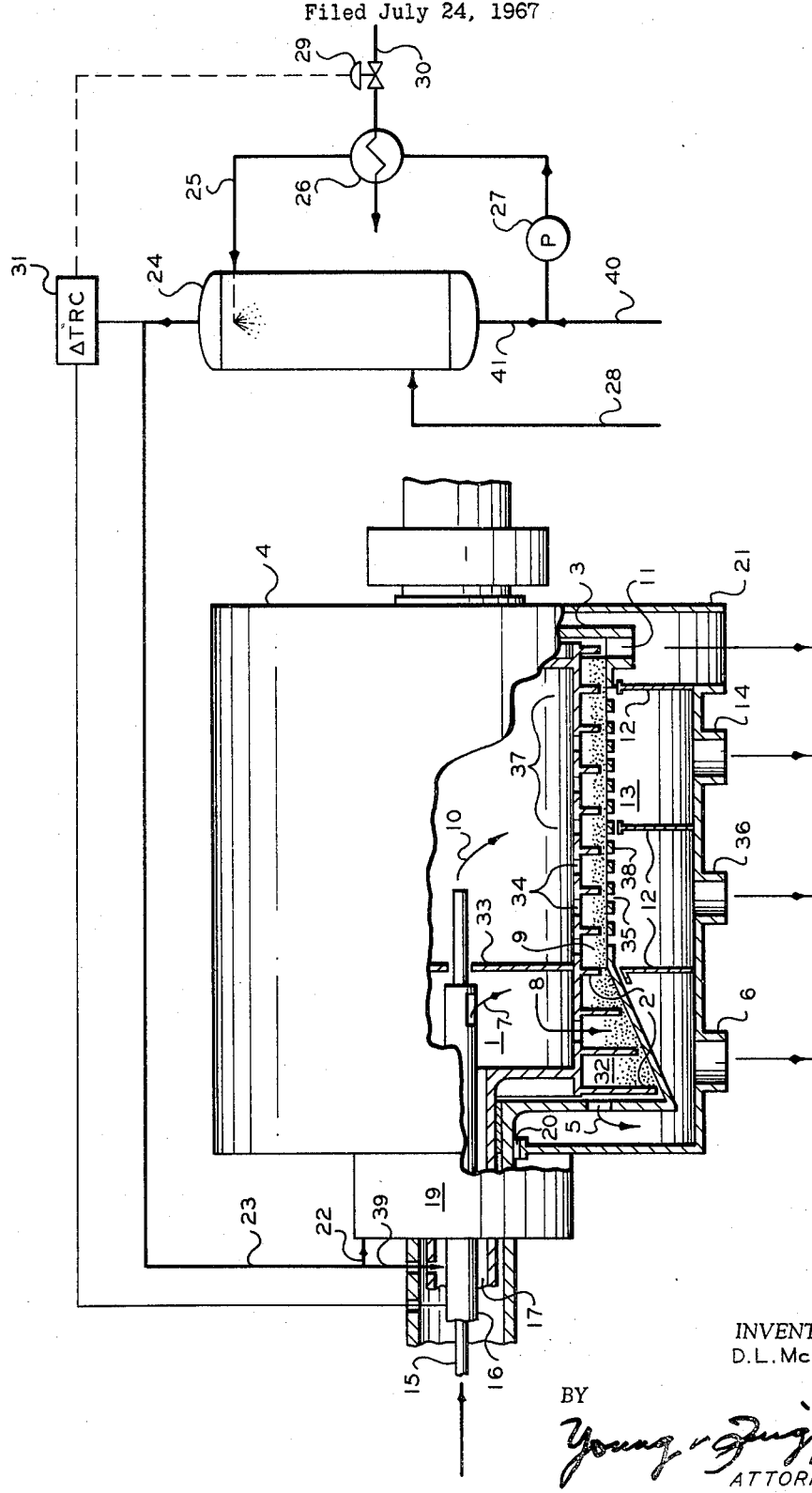

3,489,283
LIQUID-SOLIDS SEPARATION METHOD
Dwight L. McKay, Bartlesville, Okla., assignor to Phillips Petroleum Company, a corporation of Delaware
Filed July 24, 1967, Ser. No. 655,645
Int. Cl. B04b 3/00
U.S. Cl. 210—78                                    4 Claims

ABSTRACT OF THE DISCLOSURE

The deposition of the impurities from liquids in liquid-solids separation systems, solids washing and solvent displacement are controlled by controlling the concentration of a selected vapor, in the ambient atmosphere contacting the solid phases.

BACKGROUND OF THE INVENTION

In almost all types of liquid-solid separation, particularly in processes where the solids to be separated are obtained by crystallization from the liquid, it is desirable to prevent or at least minimize deposition of impurities that may be dissolved in the liquid on the separated solids, either during the separation or drying of the separated solid material. For example, in the production of sodium carbonate monohydrate from trona ore, which conventionally involves grinding, calcination, thickening, filtration, crystallization from a solvent, e.g., water, followed by separation of crystals from the mother liquor by such means as centrifugation with subsequent drying of the sodium carbonate monohydrate crystals. The major function of the crystallization step is to accomplish the separation of the desired product, sodium carbonate monohydrate, from certain impurities, the greater part of which usually comprise sodium sulfate and hydrates of sodium silicate. During the separation of the purified sodium carbonate crystals of a mother liquor containing these impurities, the evaporation of some of the solvent, e.g., water, takes place with the result that at least a portion of the impurities contained in the mother liquor are caused to precipitate or are adsorbed on the product crystals causing an increase in impurity content of the final product.

It is therefore one object of this invention to provide a method for separating solids from liquids. It is another object of this invention to provide a method for controlling the amount of solvent on crystals separated therefrom. It is another object of this invention to provide a method for controlling the evaporation of solvent in liquid-solid separation systems. It is another object of this invention to provide a method for displacing original solvent from solids separated therefrom and substituting therefore or combining therewith a second solvent. It is yet another object of this invention to provide a method for washing solids separated from a first liquid with a second solvent.

SUMMARY

In accordance with one embodiment of this invention, the concentration of a selected vapor in the ambient atmosphere contacting separated solids having some liquid thereon is controlled to regulate evaporation of said liquid or to cause the condensation of vapor and/or displacement of original liquid therefrom.

In accordance with another embodiment of this invention, the solids separated from an original solvent and retaining a portion of the original solvent on the surface thereof was contacted with a gaseous phase comprising at least in part a second solvent under conditions of temperature and pressure sufficient to effect the partial condensation of the second solvent from the vapor phase onto the surface of the solid product. In the operation of this embodiment, it is also possible to effect the displacement of original solvent by vapor-liquid interchange between the vapor phase comprising the second solvent. For example, where it is desired to remove water from the surface of a solid product separated therefrom the solids can be contacted with a vapor phase comprising acetone at a temperature and pressure sufficient to effect the condensation of a part of the acetone containing the vapor phase with the consequent partial substitution of acetone for water on the surface of the solids. It is also possible to effect not only the displacement of water but also to cause the evaporation of water, i.e., the original solvent, simultaneously with condensation of second solvent, e.g., acetone, by vapor liquid interchange. However, where it is desired to prevent the precipitation of dissolved impurities contained in the original solvent, it is, of course, necessary to provde that the second solvent have sufficient activity for the dissolved impurities to maintain the solution thereof, i.e., to prevent the precipitation of impurities onto the solid product.

DESCRIPTION OF PREFERRED EMBODIMENTS

The concept of this invention will be better understood by reference to the drawing which is intended to be only a schematic illustration of one embodiment of this invention.

Referring now to the drawing, a slurry comprising about 30 weight percent sodium carbonate monohydrate as solids product and about 70 weight percent mother liquor having dissolved therein about 31 weight percent sodium carbonate, from about 0.5 to about 2.0 weight percent sodium silicate, and about 0.5 to about 2.0 weight percent sodium sulfate is passed to centrifuge 4 through inlet pipe 16 and enters the inner rotating barrel 1 of the centrifuge at 7. Wash solution which in this embodiment preferably comprises a saturated solution of sodium carbonate is introduced into the centrifuge by way of pipe 15 and enters inner barrel 1 at 10.

It is preferred that the wash solution comprise a saturated solution of the desired product in the solvent from which the solid product was previously separated and be substantially free of impurities. In one embodiment, it is also preferred that the temperature of the wash solution be approximately the same as that of the feed slurry which is generally, in this embodiment, within the range of from about 96 to about 224° F.

The centrifuge illustrated in the drawing is only one of many that are suitable for application in the described separation. This particular apparatus is a scroll-type centrifugal separator manufactured by the Bird Machine Company and is illustrated and described in their brochure 5M-11-65. Inner chamber 1 and the concentric external chamber 3 rotate in the same direction at a rate sufficient to provide a centrifugal force of from 250 to 800 times gravity.

Slurry injected into the centrifuge at 7 is slung to the outside of inner cylinder 1 under the influence of centripetal acceleration due to the rotation of the cylinder. At least part of this material passes through orifice 8 into the annular areas between concentric rotating cylinders 1 and 3 to reservoir 32 from which clarified liquor overflows at 5 and exists the outer shell of the centrifuge by way of pipe 6. The inner cylinder 1 is further provided with a scroll impellor 2 which can comprise continuous or discontinuous helical blades disposed from the outer periphery of the inner cylinder. This scroll or impellor forces solids material accumulated in reservoir 32 through wash zone 9 and finally out of the centrifuge by way of pipe 11 and solids discharge 21. The conveying action of this scroll impellor is induced by a differential rate of rotation of inner cylinder 1 as compared to outer cylinder 3. Obviously, the helical flights can be oriented so that solids are conveyed in the desired direction depending on whether it is intended that the inner cylinder rotate at a faster or slower rate than the outer cylinder 3. It is also obvious that the rate at which solids are conveyed toward the solids outlet will depend not only upon the pitch of the helical flight but also upon the differential angular velocity existing between the two cylinders. This differential will usually be within the range of about 5 to about 50 r.p.m.

Wash water, which is, in the preferred embodiment, a saturated solution of sodium carbonate, is introduced into the inner cylinder downstream of the slurry inlet and is prevented from entering the initial separation zone by baffle 33. The principal part of this wash water passes through perforations 34 in the side wall of inner cylinder 1 substantially upstream of solids outlet 11 and exits the outer cylinder 3 through outlets 35 after passing over solids 9. During this operation the wash liquor displaces mother liquor containing impurities such as sodium sulfates and silicates from the surface of the crystals and is removed from the outer shell of centrifuge 4 by way of wash liquor exit 36. A substantial amount of the liquid remaining on the surface of the solids is removed therefrom as final drainage in area 37 and passes from the centrifuge by way of pipe 14.

During this last mentioned final drainage stage, it is desirable to remove as much liquid as possible from the surface of the crystals so that the requirements of subsequent drying operations will be less severe. However, during this step, wherein the crystals are not contacted by mother liquor or additional wash water, they are subject to the drying influence of ambient air which passes into the centrifuge under the influence of a differential pressure across the walls of the rotating cylinders. If ambient air passes over the solids retained on screen 38 within cylinder 3 during the final drainage step a substantial degree of evaporation takes place which results in the deposition of impurities from the residual liquor onto the surface of the solids product. I found that in such apparatus that the solids in the final drainage stage are contacted with sufficient atmospheric air to cause uncontrolled evaporation during final drainage. Most of this air apparently enters the centrifuge by way of annular openings 20 and 17 and similar openings due to design allowance. I have found that this evaporation and the consequent contamination of the product crystals by evaporation and precipitation can be prevented by introducing air having controlled humidity as ambient atmosphere by way of pipes 23, 22, and 39 in this embodiment. The purpose of this manner of injection is to assure that the atmosphere within the centrifuge will consist of a gas inert to the process system and having a predetermined concentration of vapor of the solvent employed in the process. By this method the evaporation of solvent from the solids during the final drainage stage in this embodiment can be controlled or prevented as desired. In addition the relative temperatures of the vapor phase and solids phase can be regulated so that the gas will be supersaturated with solvent vapor at the temperature of the solids phase whereby solvent will be deposited on the surface of the crystals upon passage of the gas through the separated solids. This latter mode of operation provides the additional advantage of a finely controlled terminal washing step having the advantage that solvent is deposited on all surfaces of the crystals due to the nature of the gas-solids contacting involved. For example, a temperature differential of 70° F. between air and $Na_2CO_3 \cdot H_2O$ crystals will result in the condensation of 2 percent wash water, based upon the weight of crystals. This wash liquid is incrementally applied to all crystal surfaces uniformly, and is therefore most effective.

The humidified gas phase is provided in this embodiment by introducing the desired gas, e.g., air, helium, nitrogen, methane, etc. through pipe 28 into scrubber 24 wherein it is contacted on passing upwardly through the column by the desired solvent vapor, e.g., water, hexane, acetone, etc., introduced by way of pipe 25 and sprayed downwardly through the column. Liquid descending to the bottom of column 24 is passed by way of pipe 41 through pump 27 and is recirculated through heat exchanger 26 which supplies heat to the circulating liquid at a rate responsive to the differential temperature between the gas-vapor mixture passing overhead from column 24 by way of pipe 23 and the slurry feed inlet to the centrifuge in pipe 16. It should be understood that this function is only one means by which the concept of this invention can be applied and that numerous other modes of operation are available by which solvent vapor concentration in the centrifuge can be controlled. In this embodiment the control of differential temperature between process lines 23 and 16 is accomplished by differential temperature controller 31 which governs the setting on valve 29 thereby controlling the rate of steam supplied through pipe 30 to heat exchanger 26.

The concept of this invention is not at all limited to gas-solids separation by centrifugation but can be applied equally well to essentially all modes of separating liquids and solids. For example, advantages similar to those above detailed can be accomplished by maintaining the gaseous atmosphere contacting separated solids on the screen of a rotary filter at a temperature and with a solvent vapor concentration sufficient to either control or prevent evaporation of solvent from the surface of the solids or cause the condensation of solvent vapor from the gas phase onto the surface of the solid product.

Other systems to which this concept can be applied are, for example, the separation of crystallized phenol from liquid phenol as solvent containing such impurities as resorcinol, acetone, and cumene in the presence of a gas phase comprising nitrogen or methane containing the desired amount of phenol vapor; the separation of adipic acid from water in the presence of an inert atmosphere having controlled humidity wherein the solvent phase contains such impurities such as succinic acid, glutaric acid, and cyclopentenone; caprolactam separation from water solvent containing cyclopentenone, cyclohexanone, and cyclohexanol in the presence of an inert humid vapor phase; the separation of normal paraffin-urea adducts from a hydrocarbon phase comprising primarily non-normal paraffinic hydrocarbons in the presence of a vapor phase having a controlled concentration of normal paraffin, or consisting only of normal paraffin hydrocarbons; and numerous others.

I claim:
1. A method for separating solids in a feed slurry from a first liquid containing dissolved impurities which comprises centrifugally separating a majority of said first liquid in liquid form from said solids leaving solids containing a portion of said first liquid on the surface thereof, washing said solids with a saturated solution of said solids and said first liquid substantially free of said dissolved impurities, and centrifugally separating a portion of said first liquid in liquid form remaining on said solids in contact with a gaseous atmosphere saturated with a vapor phase of a second liquid at the temperature of said solids whereby the vaporization of said first liquid on the surface of said solids is prevented, the temperature of said saturated solution and said gaseous atmosphere being approximately the same as the temperature of said feed slurry.

2. The method of claim 1 wherein said atmosphere in contact with said solids is supersaturated with said vapor phase at the temperature of said solids whereby a portion of said vapor phase is condensed on said solids and said first liquid on said solids is displaced by said second liquid.

3. The method of claim 1 wherein said first liquid is water, said second liquid is acetone, and wherein the vapor phase of acetone is at a temperature and pressure sufficient to effect condensation of a part of the acetone with the consequent partial substitution of acetone for water on the surface of the solids.

4. The method of claim 1 wherein the slurry feed comprises sodium carbonate, said saturated solution is a saturated solution of sodium carbonate and said gaseous atmosphere is air saturated with water vapor.

References Cited

UNITED STATES PATENTS

| | | | |
|---|---|---|---|
| 1,312,759 | 8/1919 | Stacey | 34—26 |
| 2,312,829 | 3/1943 | Bird et al. | 210—369 X |
| 2,344,686 | 3/1944 | Fanselow | 34—72 X |
| 3,268,078 | 8/1966 | Muggli | 210—376 X |
| 3,238,063 | 3/1966 | Steele | 210—215 X |

JAMES L. DECESARE, Primary Examiner

U.S. Cl. X.R.

210—178, 215, 374